(12) United States Patent
Cazier et al.

(10) Patent No.: US 8,982,263 B2
(45) Date of Patent: Mar. 17, 2015

(54) BLEMISH DETECTION AND NOTIFICATION IN AN IMAGE CAPTURE DEVICE

(75) Inventors: Robb Cazier, Fort Collins, CO (US); Shane D. Voss, Fort Collins, CO (US); Jason Yost, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/880,361

(22) PCT Filed: Nov. 11, 2010

(86) PCT No.: PCT/US2010/056295
§ 371 (c)(1),
(2), (4) Date: Apr. 18, 2013

(87) PCT Pub. No.: WO2012/064327
PCT Pub. Date: May 18, 2012

(65) Prior Publication Data
US 2013/0208164 A1 Aug. 15, 2013

(51) Int. Cl.
*H04N 5/222* (2006.01)
*H04N 9/68* (2006.01)
*H04N 7/18* (2006.01)
*H04N 5/232* (2006.01)
*H04N 5/357* (2011.01)

(52) U.S. Cl.
CPC ......... *H04N 5/23293* (2013.01); *H04N 5/3572* (2013.01)
USPC ........................ 348/333.02; 348/234; 348/135

(58) Field of Classification Search
None
See application file for complete search history.

(56) References Cited

U.S. PATENT DOCUMENTS

| 7,075,578 | B1* | 7/2006 | Kubo ............................ 348/371 |
| 7,310,450 | B2 | 12/2007 | Steinberg et al. |
| 7,590,305 | B2 | 9/2009 | Steinberg et al. |
| 2004/0218914 | A1 | 11/2004 | Sato |
| 2008/0273117 | A1* | 11/2008 | Nilsson ......................... 348/552 |
| 2009/0185716 | A1 | 7/2009 | Kato et al. |
| 2009/0278950 | A1* | 11/2009 | Deng et al. ................. 348/222.1 |
| 2011/0115980 | A1* | 5/2011 | Shmueli et al. .............. 348/607 |

FOREIGN PATENT DOCUMENTS

| JP | 2005-341381 A | 12/2005 |
| KR | 2009-0065844 A | 6/2009 |

OTHER PUBLICATIONS

"Pentax K200D 10.2MP Digital SLR Camera with Shake Reduction 18-55mm f/3.5-5.6 Lens,"< http://www.amazon.com/Pentax-Digital-Reduction-18-55mm-3-5-5-6/dp/B0012Q721Y >, retrieved on Apr. 18, 2013.
International Search Report and Written Opinion received in PCT Application No. PCT/US2010/056295, mailed Aug. 16, 2011, 9pg.

\* cited by examiner

*Primary Examiner* — Aung S Moe
*Assistant Examiner* — Euel Cowan
(74) *Attorney, Agent, or Firm* — Hewlett-Packard Patent Department

(57) ABSTRACT

A lens on an image capture device is illuminated with a known light source. The current light field created by illuminating the lens is measured at an image sensor on the device. In response to detecting that the current light field measurement fails to satisfy a threshold, a notification is provided on the device.

12 Claims, 5 Drawing Sheets

BLEMISH DETECTION AND NOTIFICATION IN AN IMAGE CAPTURE DEVICE

BACKGROUND

Image capture devices, including cell phone cameras, handheld digital cameras and video cameras, are prone to lens smudges and other blemishes due to industrial design and user handling of the devices. Smudges and other lens blemishes can cause blurry and/or distorted images.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

In many situations, a simple cleaning (e.g., wiping) of the camera lens can remove smudges and/or lens artifacts and prevent blurry images. However, blurry images and/or other artifacts are difficult to detect at the time of image capture because the resolution on camera displays is often very low. By the time the user has an opportunity to view the images on a higher resolution display, it may be too late to re-capture the image(s). Accordingly, embodiments described herein automatically detect blemishes on a camera lens and provide a notification that allows the user to clean the lens prior to capturing an image.

Figure 1:
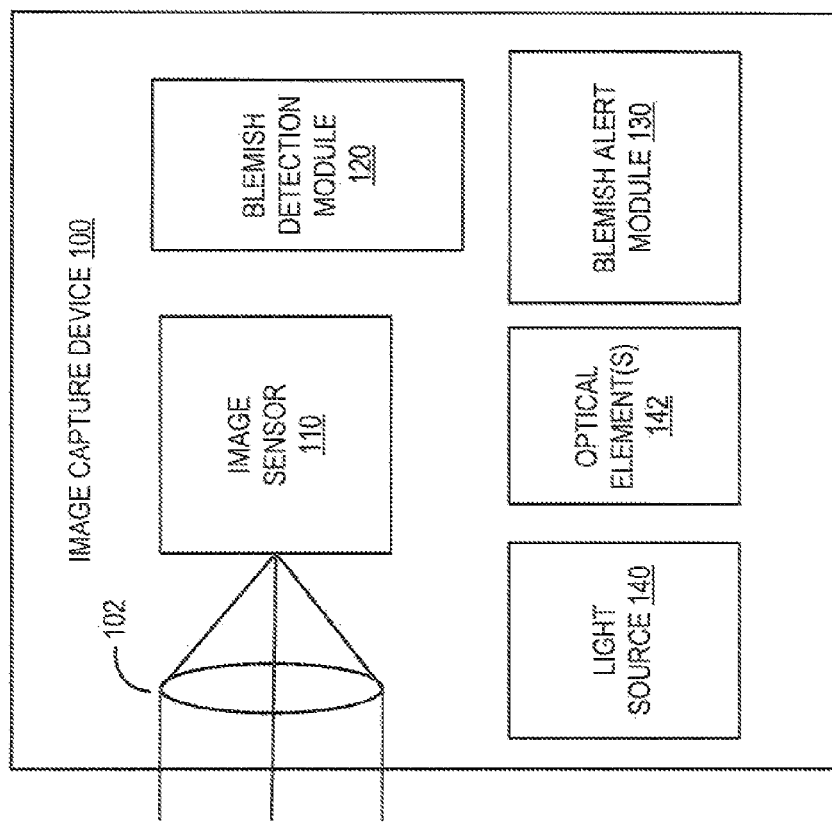
FIG. 1 is a block diagram illustrating an image capture device according to various embodiments.

FIG. 1 is a block diagram illustrating an image capture device according to various embodiments. FIG. 1 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Image capture device 100 can be a cell phone camera, a digital still camera, a video camera and/or any other device capable of capturing and converting optical images into digital images. Light source 140 illuminates lens 102. Light source 140 can be an LED (light emitting diode), LCD (liquid crystal display), a xenon lamp, or any other known lighting component to illuminate lens 102. In some embodiments, one or more optical elements 142 re-direct light from light source 140 to lens 102. For example, light source 140 could be a strobe light for flash photography. Accordingly, optical element 142 could be a prism, light pipe, mirror, or other suitable element to re-direct light from the strobe towards lens 102.

In another example embodiment, device 100 could be a clam-shell device (e.g., cell phone) where light source 140 sits adjacent to lens 102 when the claim-shell device is folded together. In this way, light source 140 shines directly onto lens 102. Other arrangements for positioning the light source to shine on the lens may be used, including examples described later.

Lens 102 converts light from light source 140 into an optical image. Image sensor 110 measures the light field produced by the lens. Blemish detection module 120 determines if there is a blemish on lens 102 based on the measured light field. As used herein, a blemish refers to any lens artifact that may cause distortions and/or corrupt the quality of an image. Examples of blemishes include, but are not limited to, smudges (e.g., from fingers, face, etc.), dust, dirt, scratches, etc. When blemish detection module 120 detects a blemish, blemish alert module 130 provides an indication that a blemish has been detected. For example, the alert could be a textual notification on a display screen of the device, an audible alert (e.g., beeping, automated speech, etc.), or a visual alert such as a flashing light, etc. The indication of the blemish gives the user of device 100 a warning and opportunity to clean lens 102 or otherwise address the cause of the alert before proceeding to capture one or more images.

FIGS. 2A and 2B are block diagrams of an image capture device according to various embodiments. FIGS. 2A and 2B include particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Image capture device 200 includes a slide-out housing illustrated in both the open (FIG. 2A) and closed (FIG. 2B) positions. The slider 206 portion of the housing slides apart from the main body 204. In various embodiments, slider 206 includes a slide-out keyboard although it is not necessary that slider 206 include a slide-out keyboard. As shown, lens 202 is unblocked and available for use when slider 206 is in the open position (FIG. 2A). Thus, when slider 206 is in the open position, image capture device 200 can capture images.

When slider 206 is slid into the closed position (FIG. 2B), lens 202 is blocked and image capture device may be unable to capture images. The blocking of lens 202 when slider 206 is moved into the closed position protects lens 202 from being touched, scratched or otherwise disturbed, thereby preventing blemishes. In addition, when slider 208 is in the closed position, light source 240, located on slider 206, is positioned adjacent to lens 202. Thus, light source 240 is capable of illuminating lens 202 when slider 206 is in the closed position.

In various embodiments, light source 240 illuminates lens 202 each time slider 206 is moved into the closed position. However, in alternate embodiments, light source 240 may illuminate lens 202 less frequently. Light source 240 may be a constant white light source, although light source 240 is not limited to any particular color. For example, light source 240 may be a variable colored light source, where multiple different colors are displayed for different periods of time.

Blemish detection module 220 measures the light field captured by image sensor 210 as a result of illuminating lens 202. When lens 202 is unblemished, the measured light field exhibits predictable characteristics. In various embodiments, the measured light field may be a flat-field. In other embodiments, the measured light field may exhibit roll-off, shading, and/or vignetting, for example, towards the outer pixels of image sensor 210. Various techniques may be used to calibrate the measured light field to compensate, for example, for non-uniform gains and/or dark currents in individual pixel values. Such calibrations may be useful for correcting internal pixel defects and other errors that are a function of the internal device hardware. However, re-calibrating image sensor 210 in view of a blemish on lens 202 will only magnify the distortive effects resulting from the blemish.

Accordingly, blemish detection module 220 determines the characteristics of an unblemished light field. Such characteristics may take the form of a characteristics map or some other collection of pixel data for image sensor 210. This information may be stored, for example, in memory 260. In various embodiments, blemish detection module 220 stores characteristics of an unblemished light field in memory 260 prior to the first use of image capture device 200 (e.g., prior to shipping, during setup, initialization, etc.). Subsequently, each time slider 206 is closed, blemish detection module 220 can measure the current light field and compare the results against the unblemished light field. If blemish detection module 220 determines the current light field does not satisfy a threshold based on the unblemished light field, then blemish detection module 220 informs blemish alert module 230 that a blemish has been detected.

Given that light source 240 may change over time, blemish detection module 220 maintains a running average of unblemished light field measurements in certain embodiments. For example, each time slider 206 is closed, blemish detection module 220 measures the current light field. If the measured light field fails to satisfy a threshold, then the current light field measurement is thrown out (and a blemish alert is triggered). If, however, the current light field measurement satisfies the threshold, blemish detection module 220 determines that there is no blemish and the current light field measurement is included (e.g., via dark frame subtraction) in the running average of unblemished light field measurements (e.g., stored in memory 260). If a detected blemish is due to a scratch, the user may not be able to fix or remove the scratch. In such cases, the user may be given the option to instruct blemish detection module 220 to ignore that particular blemish in the future or factor the blemish into the running average of unblemished light field measurements.

Blemish alert module 230 triggers a blemish alert in response to receiving an indication from blemish detection module 220 that a blemish has been detected. A blemish alert could be a flashing light on device 200, an audible alert, or a textual alert. Other types of alerts could also be used. A textual alert might be displayed on a display screen of device 200. Textual alerts could be displayed immediately upon detection or they could be delayed, for example, until device 200 is switched into camera mode.

Figure 2:
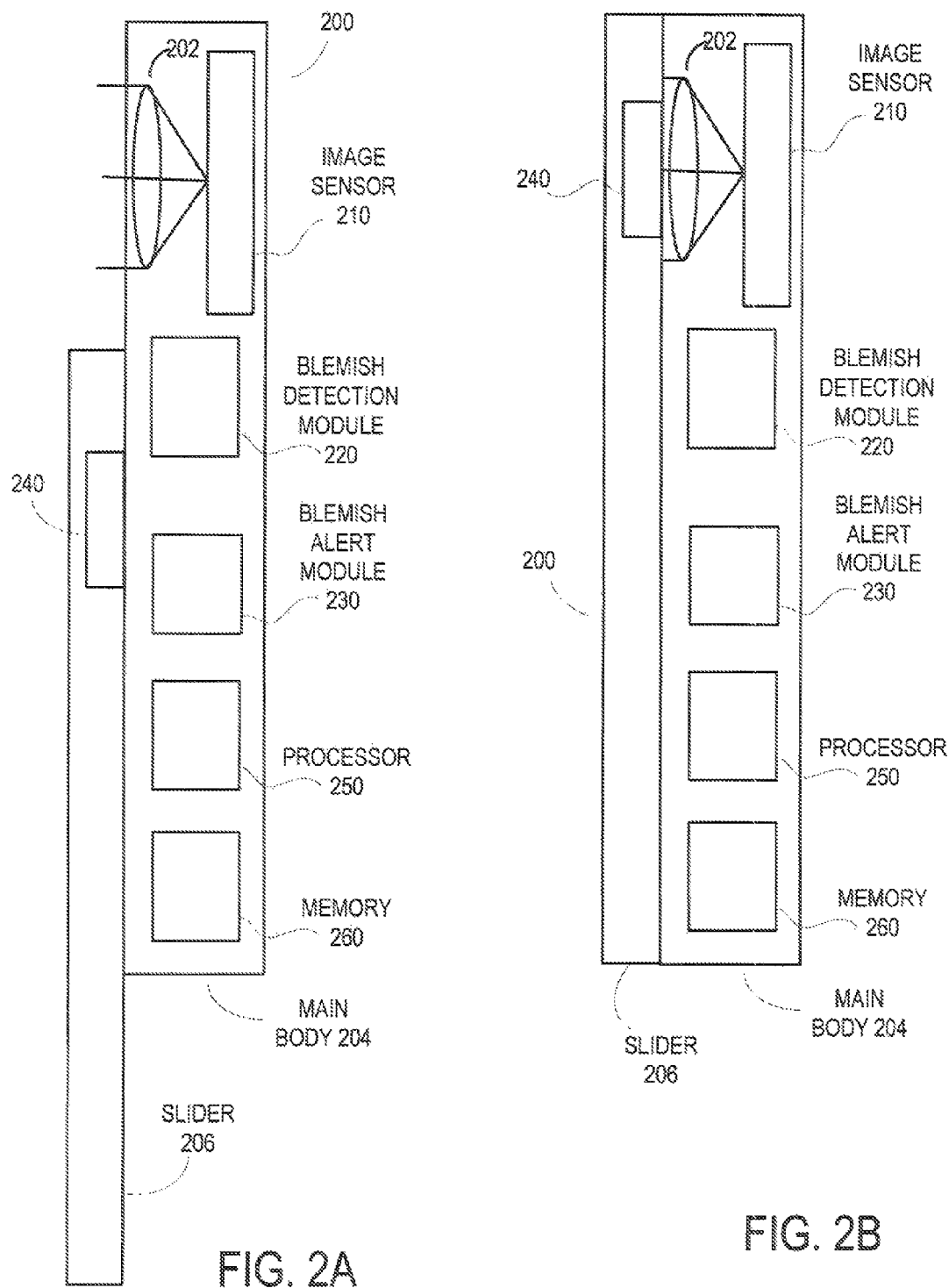
FIGS. 2A and 2B are block diagrams illustrating an image capture device according to various embodiments.

Various modules and/or components illustrated and described in FIG. 2 may be implemented as a computer-readable storage medium containing instructions executed by a processor (e.g., processor 250) and stored in a memory (e.g., storage 260).

Figure 3:
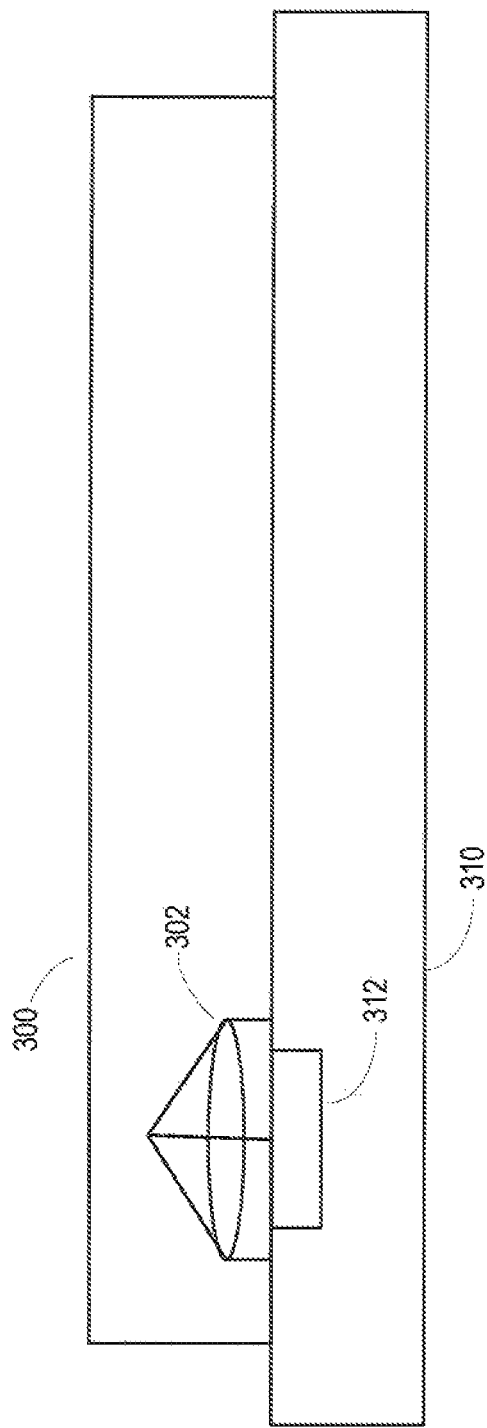
FIG. 3 is a block diagram illustrating a system according to various embodiments.

FIG. 3 is a block diagram illustrating a system according to various embodiments. In particular, FIG. 3 illustrates an image capture device 300 having a lens 302. Image capture device 300 may include some or all the components, modules, etc. of image capture device 100 and/or 200, as described above. In FIG. 3, however, device 300 is resting on a dock 310. Dock 310 may be for used charging, communications/connectivity, device storage (e.g., a carrying case, device holster, etc.), etc. or some combination of these. In various embodiments, rather than including a light source directly on image capture device 300, light source 312 is located on dock 310. The location of light source 312 is such that light source 312 is adjacent to lens 302 when device 300 is docked with dock 310. Based on illumination from light source 312, measuring means on device 300 (including but not limited to components and/or modules described herein) measure the light field (e.g., on an image sensor). Blemish detection means on device 300 (including but not limited to components and/or modules described herein) determine whether there is a blemish on lens 312 based on the light field measurement. Blemish notification means (including but not limited to components and/or modules described herein) provide a notification that a blemish has been detected.

Figure 4:
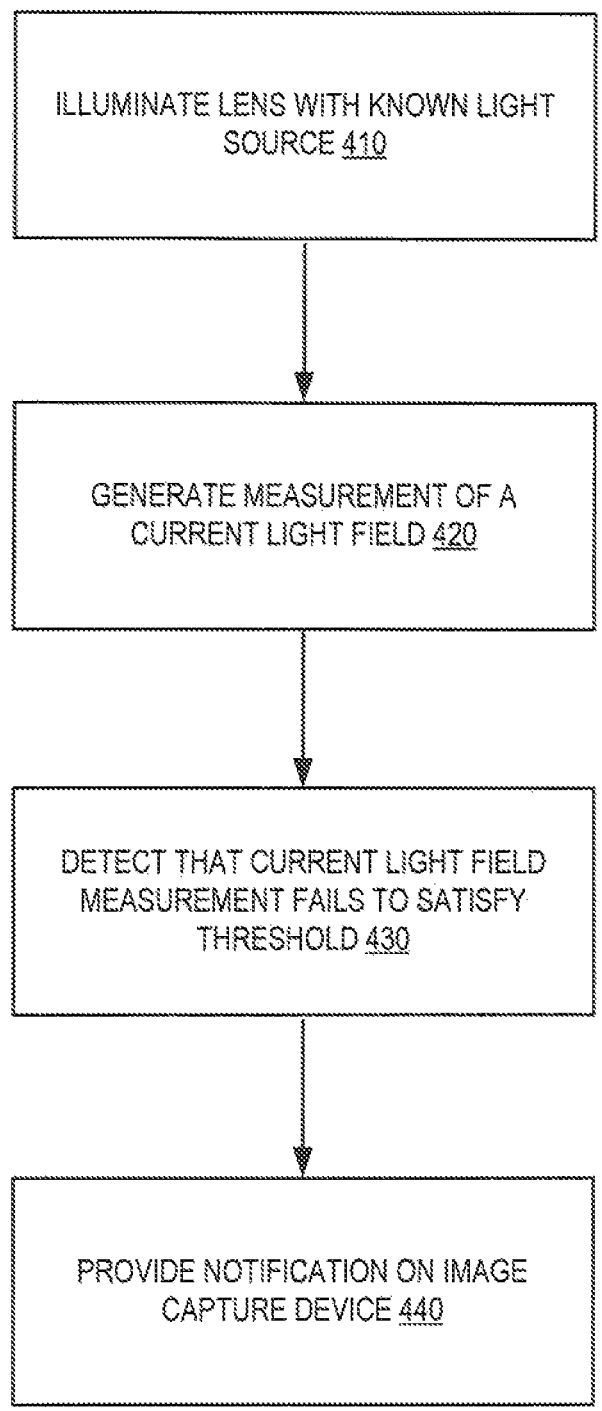
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A lens of an image capture device is illuminated 410 with a known light source. The known light source may be disposed on the image capture device but it is not necessary that it be disposed on the image capture device. For example, the known light source may be fixed on a docking station (or carrying case) to be adjacent to an image capture device lens when the image capture device is connected to the docking station (or placed in the carrying case). The term "known light source" refers herein to a light source that produces a light field (e.g., an all-white field, an unchanging spectral field, etc) characterized by constancy each time the light source illuminates the lens on an image capture device. In other words, a known light source is controlled and/or predictable such that light field measurements may be consistent. In addition, known light sources contemplated herein are transparent to the user in that the user is not required to take any specific actions (i.e., beyond normal use, including closing the device, docking the device, storing the device, etc.) to position light source for proper illumination of the lens.

A measurement of a current light field is generated 420 in response to illuminating the lens with the known light source. Based on the light field measurement, it is detected 430 when the current light field measurement fails to satisfy a threshold. For example, the threshold could be based on a ratio of the expected light field against the current light field. Other threshold calculations could also be used. When a current light field measurement fails to satisfy the threshold, a notification is provided 440 on the image capture device. The notification could be a visual alert (e.g., flashing red light), an audible alert (e.g., beeping, automated voice, etc.), a textual alert (e.g., displayed on a display screen saying "blemish detected," etc.) or other suitable alert mechanism.

Figure 5:
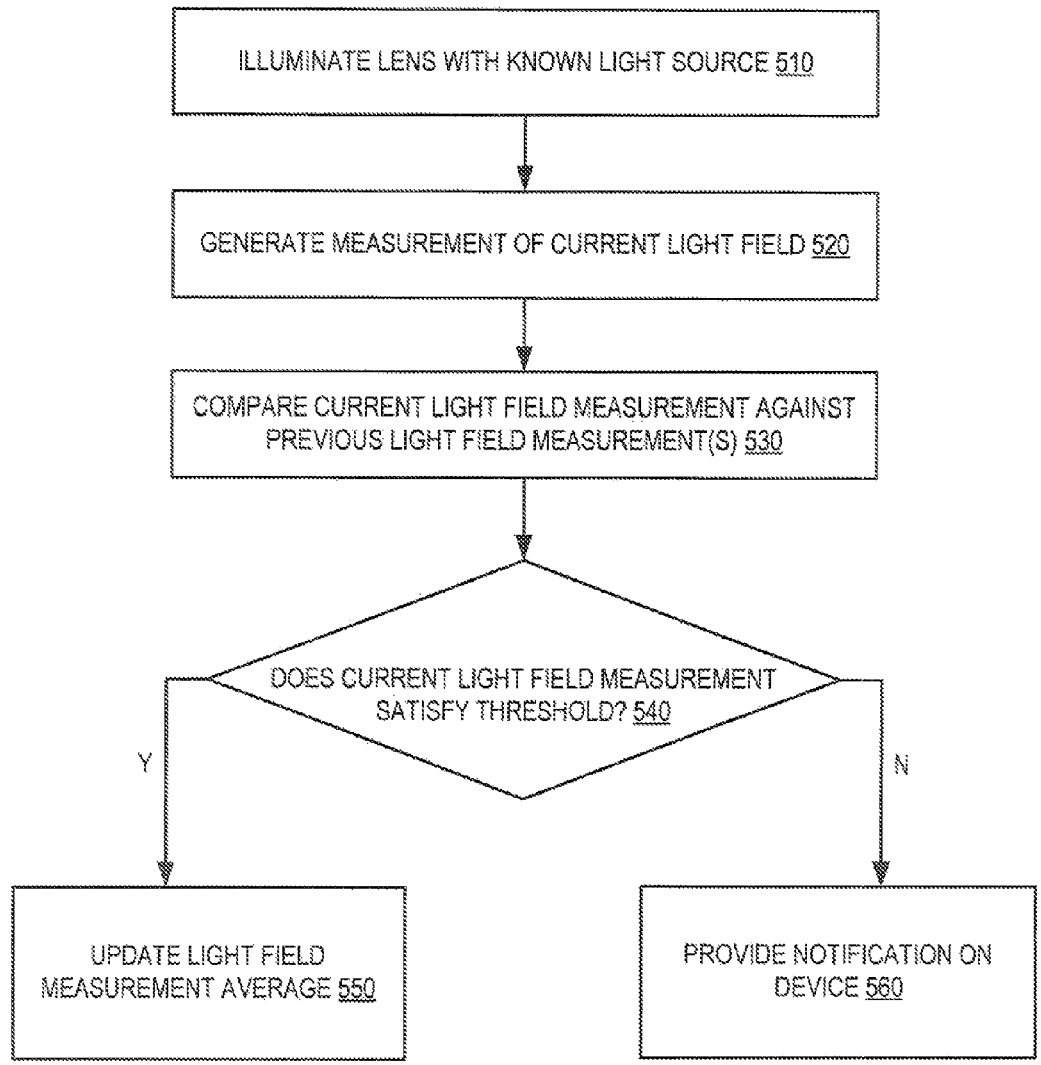
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in other orders of execution may also be used according to teachings described herein.

A lens of an image capture device is illuminated 510 with a known light source. The known light source may be disposed on the image capture device but it is not necessary that it be disposed on the image capture device. A measurement of a current light field is generated 520 in response to illuminating the lens.

The current light field measurement is compared 530 against one or more previous light field measurements. Based on the comparison, it is determined 540 whether the current light field measurement satisfies a threshold. In other words, the comparison determines whether the current light field is sufficiently similar to a previous light field to conclude that no blemish is present on the lens. If the current light field measurement satisfies the threshold, then a light field measurement average is updated 550.

It should be noted that a known light source may change over time (e.g., dim, degrade, etc.). Accordingly, corresponding light field measurements will change over time as well, even in the absence of lens blemishes. However, any changes to the light source over time are likely to be incremental. Thus, in various embodiments, the light field measurement threshold is set such that incremental changes to the light source over time will still result in a light field measurement that satisfies the threshold. In this way, the incremental changes to the light source are factored into the light field measurement average over time so as to prevent a future accumulation of incremental changes from producing a light field measurement that fails to satisfy the threshold.

If, however, it is determined 540 that the current light field measurement fails to satisfy the threshold, then a notification is provided 560 to the user of the image capture device that a blemish has been detected. This notification gives the user the opportunity to remove the blemish (e.g., clean the lens) prior to capturing any further images. As discussed above, the notification could be a visual alert (e.g., flashing red light), an audible alert (e.g., beeping, automated voice, etc.), a textual alert (e.g., displayed on a display screen saying "blemish detected," etc.) or other suitable alert mechanism.

Various modifications may be made to the disclosed embodiments and implementations of the invention without departing from their scope. Therefore, the illustrations and examples herein should be construed in an illustrative, and not a restrictive sense.

The invention claimed is:

1. A method performed by an image capture device, comprising:
    determining characteristics of an unblemished light field, wherein the determined characteristics include a running average of multiple previous light field measurements that satisfy a threshold;
    illuminating a lens that is disposed on the device with a known light source;
    generating a measurement of a current light field at an image sensor on the device, the current light field created by illuminating the lens;
    comparing the current light field measurement against the running average of the multiple previous light field measurements;
    determining that a difference between the current light field measurement and the running average of the multiple previous light field measurements fails to satisfy the threshold; and
    providing a notification on the device in response to the determining that the difference between the current light field measurement and the running average of the multiple previous light field measurements fails to satisfy the threshold.

2. The method of claim 1, wherein determining that the difference between the current light field measurement and the running average of the multiple previous light field measurements fails to satisfy the threshold comprises:
    determining that a ratio between the current light field measurement and the running average of the multiple previous light field measurements fails to satisfy the threshold.

3. The method of claim 1, further comprising:
    updating the running average of the multiple previous light field measurements to include the current light field measurement in response to determining that the difference between the current light field measurement and the running average of the multiple previous light field measurements satisfies the threshold; and
    not updating the running average of the multiple previous light field measurements to include the current light field measurement in response to determining that the difference between the current light field measurement and the running average of the multiple previous light field measurements does not satisfy the threshold.

4. An image capture device, comprising:
    a lens to convert light into an optical image;
    a light source to illuminate the lens;
    an image sensor to measure a light field produced by illuminating the lens with the light source;
    a blemish detection module to:
        determine characteristics of an unblemished light field, wherein the determined characteristics include a running average of multiple previous light field measurements that satisfy a threshold;
        compare the light field against the running average of the multiple previous light field measurements;
        determine that a difference between the light field and the running average of the multiple previous light field measurements fails to satisfy the threshold; and
    a blemish alert module to provide a notification that a blemish has been detected in response determining that the difference between the light field and the running average of the multiple previous light field measurements fails to satisfy the threshold.

5. The image capture device of claim 4, wherein the light source is a colored light source.

6. The image capture device of claim 4, further comprising a slide-out housing for the image capture device, the slide-out housing having two sliding components, wherein the lens is mounted on the first of the sliding components and the light source is mounted on the second of the sliding components, and wherein the light source is positioned adjacent to the lens when the sliding components are slid together into a closed position.

7. The image capture device of claim 4, wherein the light source is a camera strobe and wherein the image capture device further comprises:
    at least one optical element to re-direct light from the strobe toward the lens.

8. A system, comprising:
    an imaging device including:
        a lens to convert light into an optical image;
        a sensor to measure a light field resulting from illuminating the lens;
        a blemish detection module to:
            determine characteristics of an unblemished light field;
            maintain a running average of multiple previous light field measurements that satisfy a threshold;

compare the light field against the running average of the multiple previous light field measurements; and
determine that a ratio of the light field and the running average of the multiple previous light field measurements fails to satisfy the threshold; and
a blemish notification module to provide a notification that a blemish has been detected in response to determining the ratio of the light field and the running average of the multiple previous light field measurements fails to satisfy the threshold; and
a light source to illuminate the lens.

9. The system of claim 8, wherein the light source is disposed on a docking member and wherein the light source is positioned adjacent to the lens when the imaging device is docked with the docking member.

10. The system of claim 8, wherein the light source is disposed on the inside of a case and wherein the light source is positioned adjacent to the lens when the imaging device is placed inside the case.

11. The system of claim 8, wherein the blemish detection module further updates the running average of the multiple previous light field measurements when a current measured light field satisfies the threshold.

12. The system of claim 8, wherein the blemish detection module determines there is a blemish on the lens if a current light field measured by the sensor fails to satisfy the threshold.

\* \* \* \* \*